Jan. 30, 1962 N. J. BOSE ETAL 3,019,072
X-Y PLOTTER

Filed Aug. 8, 1960 9 Sheets-Sheet 1

FIG. 1

INVENTORS
NORMAN J. BOSE
NOLAN R. KRONINGER
BY
ATTORNEY

FIG. 2

Jan. 30, 1962 N. J. BOSE ETAL 3,019,072
X-Y PLOTTER

Filed Aug. 8, 1960 9 Sheets-Sheet 3

Jan. 30, 1962  N. J. BOSE ETAL  3,019,072
X-Y PLOTTER
Filed Aug. 8, 1960  9 Sheets-Sheet 4

Jan. 30, 1962  N. J. BOSE ETAL  3,019,072
X-Y PLOTTER
Filed Aug. 8, 1960  9 Sheets-Sheet 5

Jan. 30, 1962   N. J. BOSE ETAL   3,019,072
X-Y PLOTTER
Filed Aug. 8, 1960   9 Sheets-Sheet 6

FIG. 13

Jan. 30, 1962  N. J. BOSE ETAL  3,019,072
X-Y PLOTTER
Filed Aug. 8, 1960  9 Sheets-Sheet 8

3,019,072
X-Y PLOTTER
Norman J. Bose, North Hollywood, and Nolan R. Kroninger, Sepulveda, Calif., assignors to General Precision, Inc., a corporation of Delaware
Filed Aug. 8, 1960, Ser. No. 48,114
4 Claims. (Cl. 346—29)

This invention relates to recording apparatus and more particularly to an X-Y plotter which uses a rectangular coordinate system to obtain a graphical plot wherein any point on the plot is defined by the magnitude of two corresponding D.C. input voltages to the plotter.

Many prior recording mechanisms have been developed for plotting X and Y coordinates on a graph. However, these devices have been relatively complicated and are slow in operation. Furthermore, prior X-Y plotters have been difficult to operate and required a great deal of care and adjustment during operation.

Briefly stated, one preferred embodiment of the X-Y plotter of the present invention consists essentially of a cabinet supporting the plot table and the control panel and chassis assembly. The plot table includes the recorder Y arm and track assembly which is driven along the X ordinate by a cable system from an X axis servo motor and a pen carriage which rides along the Y arm and is driven in the direction of the Y ordinate by another cable system from the Y axis servo motor. A translucent platen on the plot table is provided with a plurality of openings around its periphery which extend into a vacuum chamber evacuated by a vacuum impeller to hold the graph paper securely in place on the plot area. The X axis potentiometer is mounted along one edge of the platen where it is slideably engaged by a brush on the Y arm, and a Y potentiometer which is mounted in an etched circuit card is mounted on the bottom of the Y arm and is engaged by a brush on the pen carriage. The etched circuit card also includes a plurality of conductive strips which are engaged by respective brushes to actuate the pen solenoid and complete other electrical connections. Most of the controls on the control panel are of the push button type, including the selector buttons for X and Y range scale attenuators, as well as push button controls to turn the power and the vacuum for graph paper hold-down on and off. Additional push buttons are provided for the plot clear, four quadrant plot, reference plot, and X-Y reference functions, plus two buttons for selecting a continuous trace or manual plot of individual points on the graph. Four thumbwheels are also provided on the control panel for the X and Y scale vernier and the X and Y axis reference, the latter also having a counter associated therewith and visible through the control panel to indicate the distance in inches from a fixed reference point at which the X and Y axis respectively may be positioned at any point on the plot area. Suitable input jacks and receptacles are provided for the X and Y inputs, as well as connections to other auxiliary equipment.

One object of the present invention is to provide an X-Y plotter which is not only accurate and simple to operate, but is extremely versatile and adapted to receive substantially all types of input signals, and plot the X and Y coordinates from the exact center or any other desired position on the plot area.

Other objects and many of the attendant advantages of this invention will be readily appreciated as the same becomes better understood by reference to the following detailed description when considered in connection with the accompanying drawings wherein;

Figure 1:
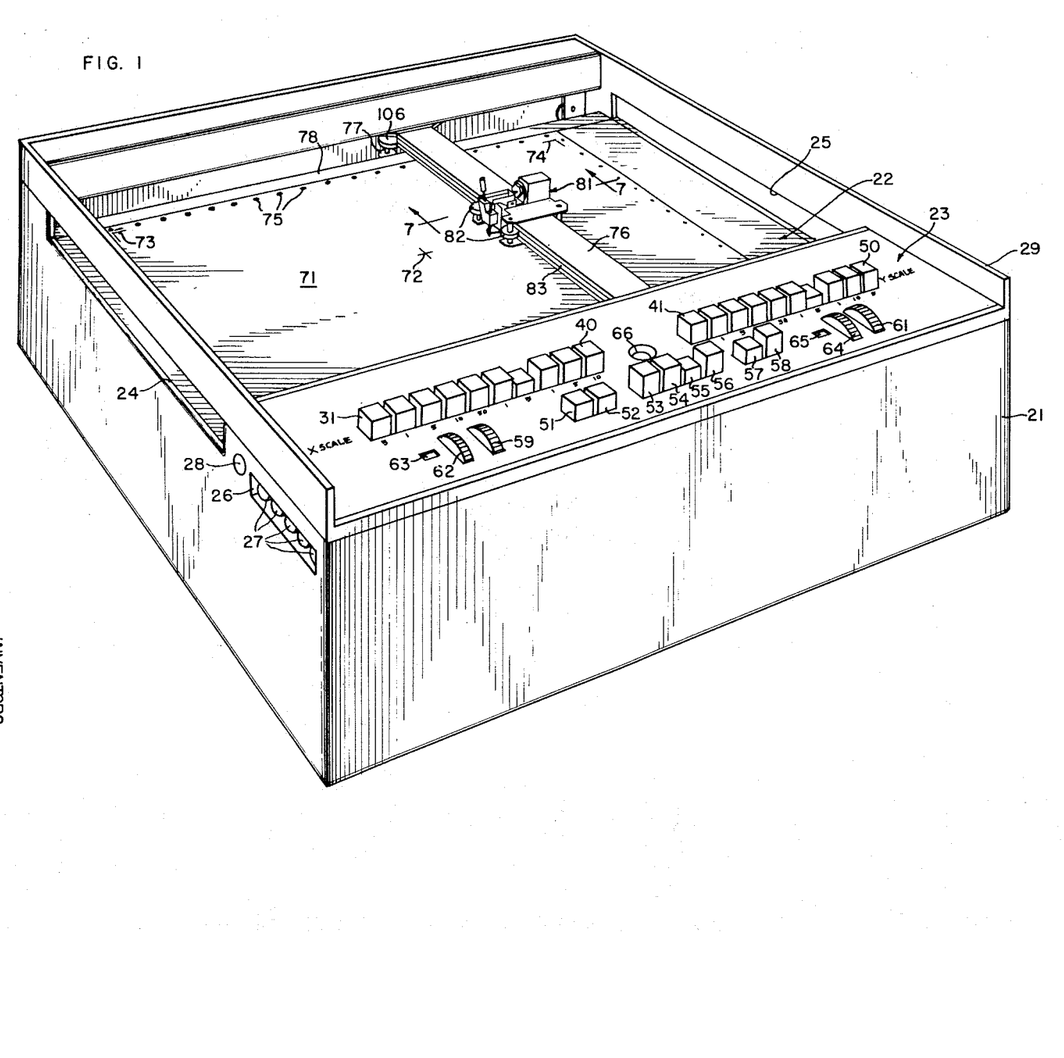
FIGURE 1 is a perspective view of one preferred embodiment of the present invention mounted in a supporting cabinet structure.

Referring now to the drawing in detail and more particularly to FIGURE 1, one preferred embodiment of the X-Y plotter of the present invention is illustrated as mounted in a cabinet 21 which supports the plot table assembly 22 and the control panel and chassis assembly 23.

The cabinet 21 may be provided with slots 24 and 25 at opposite ends of the plot table through which a continuous roll of graph paper or strip chart may be fed across the plot table assembly 22. The holders for the strip chart, (not shown), would be mounted on the outside of the cabinet adjacent slots 24 and 25.

The cabinet 21 is also provided with a recess 26 adjacent one end of the control panel 23 through which extend a plurality of input jacks 27 for the X and Y input signals and ground. Spring button 28 is shown adjacent the recess 26 for releasing the removable bezel or cover 29, and a similar button (not shown) is also provided on the opposite side of cabinet 21.

The control panel 23 is provided with a plurality of push buttons 31 through 40 for selecting the proper attenuators for the X range scale and another plurality of push buttons 41 through 50 for selecting the proper attenuators for the Y range scale.

Push buttons 51 and 52 turn the power and the vacuum impeller motor on and off. The push buttons 53, 54, 55 and 56 are utilized for selecting the plot clear, four quadrant plot, reference plot or X-Y reference, respectively, and the push buttons 57 and 58 are used to select a continuous trace or manual plot with the pen mounted on the pen carriage.

A thumb wheel 59 operates an X scale vernier to provide a finer variation between the range scales which may be selected by the push buttons 31 through 40, and the thumb wheel 61 operates a Y scale vernier for a similar function in connection with the push buttons 41 through 50.

The thumb wheel 62 is used to vary the X axis reference and a counter 63, which shows through a window in control panel 23, indicates the distance in inches that the X reference has been moved from a particular fixed reference point. The thumb wheel 64 performs a similar function with regard to the Y axis reference and the distance in inches is indicated by the counter 65 through another window. A pilot light 66 indicates when the power supply is on.

The plot table assembly 22 as illustrated in FIGURE 1 has a platen 71 which is preferably formed of translucent plastic such as milk white lucite, provided with fiduciary marks such as the center mark 72 and the corner grid marks 73 and 74 to properly position the graph paper. A plurality of peripheral openings 75 extend through the platen 71 into a vacuum chamber which securely hold the graph paper in position on the plot area.

Figure 2:
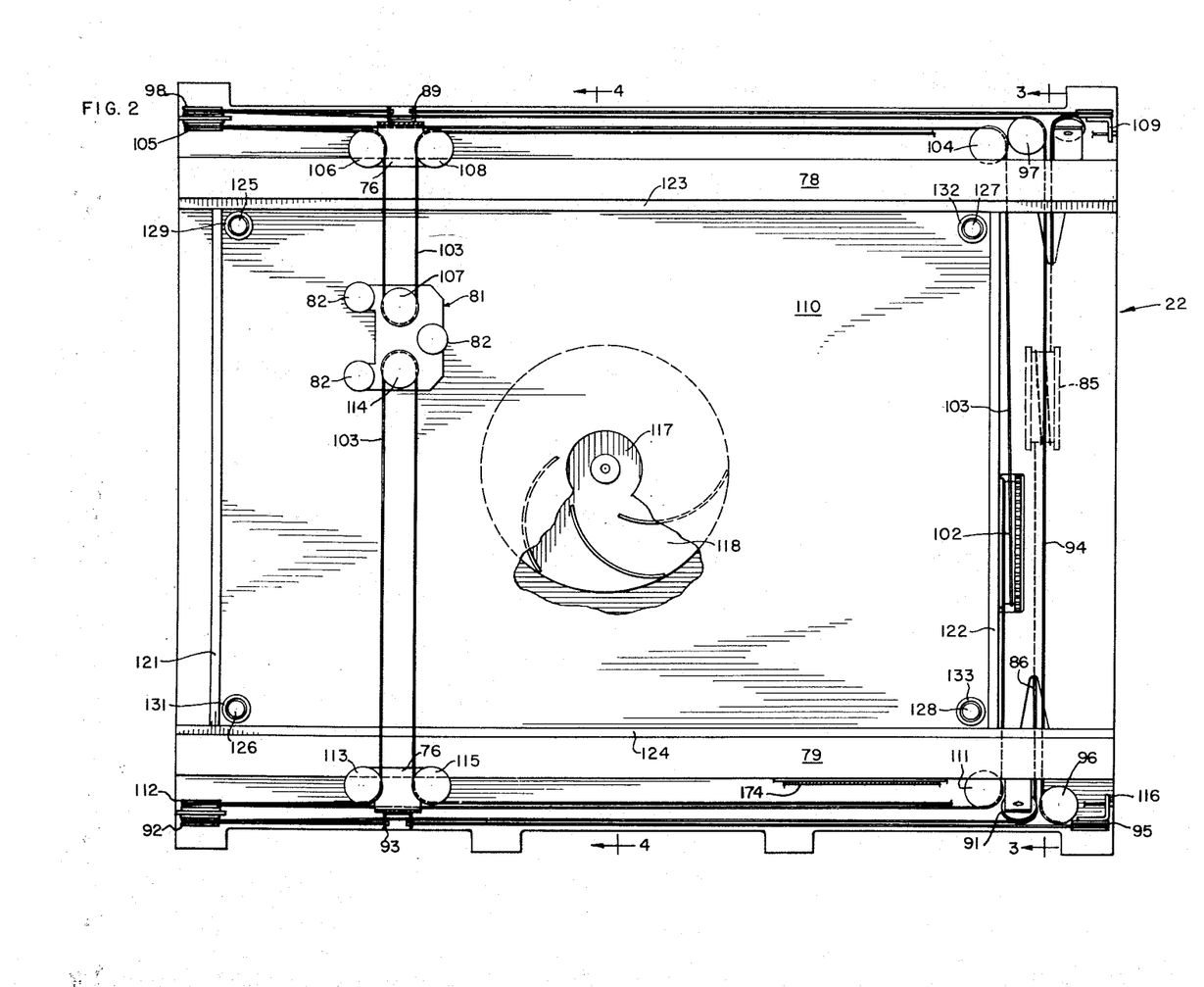
FIGURE 2 is a plan view of the operating mechanism of FIGURE 1 removed from the cabinet and with portions broken away to illustrate more clearly the cable and pulley arrangement as well as other details.
Figure 3:
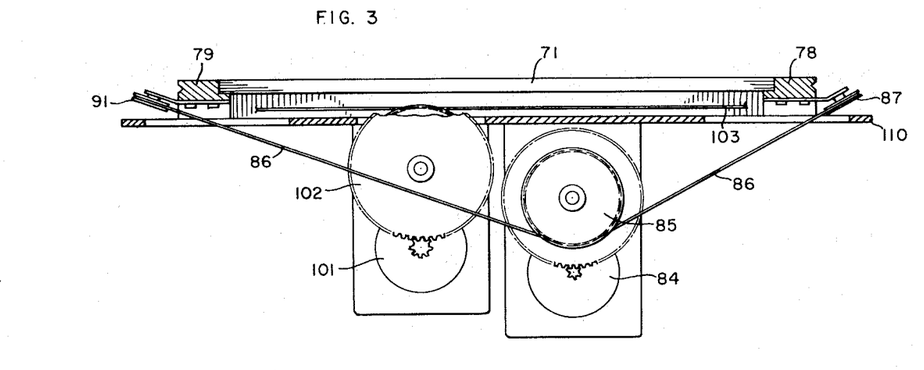
FIGURE 3 is a transverse sectional view taken on the line 3—3 of FIGURE 2.
Figure 4:
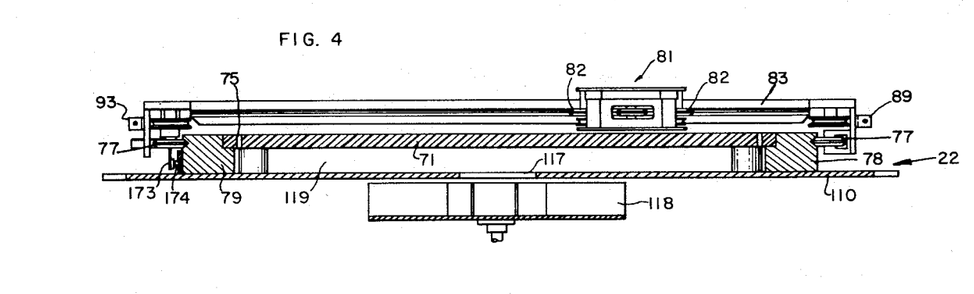
FIGURE 4 is a transverse sectional view taken on the line 4—4 of FIGURE 2.

The recorder Y arm is mounted for movement across the plot table in the direction of the X ordinate and is mounted on a plurality of guide wheels such as 77 engaging tracks on opposite sides of the plot table, such as 78 in FIGURE 1 and 79 shown in FIGURES 2, 3 and 4.

The pen carriage assembly 81 is driven along the Y arm in the direction of the Y ordinate and is provided with guide wheels such as those shown at 82 which engage the sides of U shaped track 83 forming a part of the Y arm assembly 76.

Figure 5:
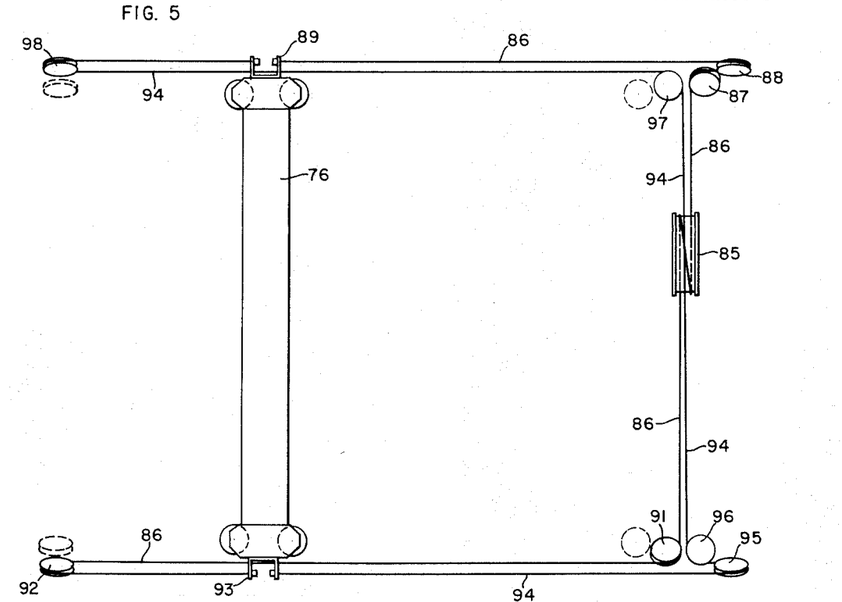
FIGURE 5 is a schematic view illustrating the X-axis cable and pulley system for moving the Y arm across the plotting table.

Referring now to FIGURES 2, 3 and 4, the plot table assembly is shown in more detail with the translucent platen 71 removed in FIGURE 2 to show more clearly certain details of construction and particularly the specific pulley and cable arrangement for actuating the Y arm and the pen carriage. The cable and pulley X and Y drives are also shown separate in the schematic views of FIGURES 5 and 6 respectively.

The Y arm 76 is actuated by a servo motor 84 which drives a drum 85 around which is trained a cable 86 extending around fixed pulleys 87 and 88 to a resilient bracket or tension spring clip 89 on the Y arm. The cable 86 after several turns around the drum 85 also extends in the opposite direction around fixed pulleys 91 and 92 and back to another resilient bracket 93 at the opposite end of the Y arm.

A second cable 94 is also connected to the bracket 93 and extends around fixed pulleys 95, 96, 97 and 98 back to the bracket 89 on the Y arm to assure parallel motion of the Y arm 76 across the plot table 22.

It will be apparent the rotation of the drum 85 in either direction through the cable and pulley arrangement shown in FIGURES 2 through 5 will move the Y arm 76 in the direction of the X ordinate with a truly parallel motion.

The pen carriage 81 is moved in the direction of the Y ordinate on the Y arm 76 by means of another pulley and cable arrangement illustrated in FIGURES 2 through 4 and 6 from a Y servo motor 101 which drives the drum 102. A single continuous cable 103 has several turns trained around the drum 102 in one direction, extends around the fixed pulleys 104 and 105 to a pulley 106 on the end of the Y arm and out around a pulley 107 mounted on the pen carriage 81, and then back around another pulley 108 on the Y arm 76 to a resilient bracket or tension spring clip 109 fixed on the base plate 110 of the plot table assembly 22.

Figure 6:
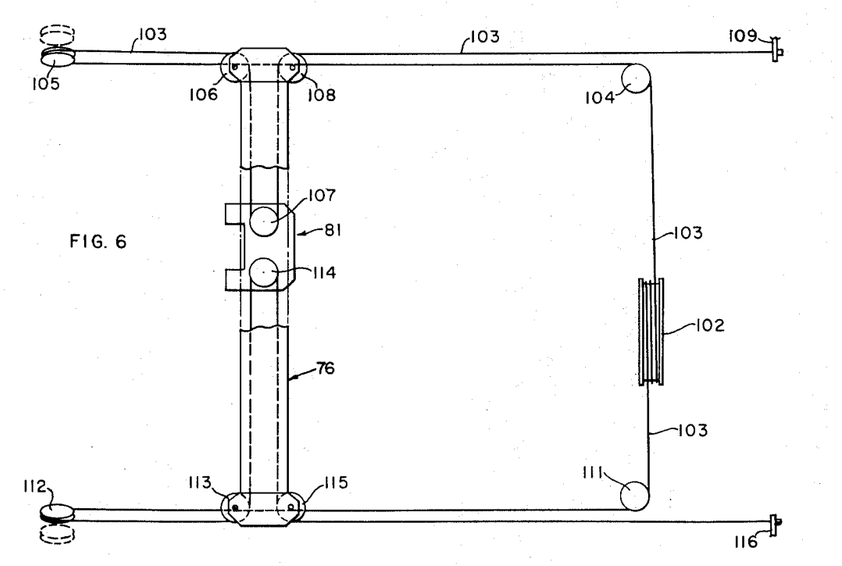
FIGURE 6 is a schematic view illustrating the cable and pulley arrangement for moving the pen carriage along the Y arm.

In the other direction the cable 103 extends from the drum 102 around a fixed pulley 111 and another fixed pulley 112 at the opposite end of the plot table, and then back around a pulley 113 mounted on one end of the Y arm, around a pulley 114 on the pen carriage, and back around another pulley 115 on the end of the Y arm 26 to another resilient bracket 116 mounted on the base plate 110 of the plot table 22.

The cable used for the cable and pulley systems described supra is preferably a 1 x 7 construction which consists of one center strand and six outer strands of 0.003 "Elgiloy" wire with a left hand direction of lay and a length of lay of 3/32 of an inch. This results in a finished cable having a diameter of 0.009" which is preferably heat treated to an ultimate strength of approximately 368,000 p.s.i. after the cable is stranded.

The cable is then extruded with a nylon jacket to about 0.020 diameter.

The nominal composition of Elgiloy wire is described in U.S. Patent No. 2,524,661 and consists of

|  | Percent |
| --- | --- |
| Cobalt | 40 |
| Chromium | 20 |
| Nickel | 15 |
| Molybdenum | 7 |
| Manganese | 2 |
| Carbon | 0.15 |
| Beryllium | 0.04 |
| Iron | 15.81 |

This particular construction provides a cable which appears to be much more satisfactory than any cable previously used for a plotter cable drive, and has been tested to over one million cycles, at least ten times the expected life.

As shown in FIGURES 2 and 4, the base plate 110 of the plot table 22 is provided with a central opening 117 below which is mounted a vacuum impeller or centrifugal blower 118 driven by a suitable motor (not shown) to evacuate the vacuum chamber 119 which is formed by the base plate 110 and the platen 71 together with the end walls 121 and 122 and the tracks 78 and 79. Four lamps 125, 126, 127 and 128 are mounted in each corner of the vacuum chamber and may have cylindrical lamp shades 129, 131, 132 and 133 to provide back lighting for the fiduciary corner marks such as 73 and 74 in FIGURE 1.

The pen carriage 81 and Y arm 76 are illustrated in more detail in FIGURES 7, 8, 9 and 10 wherein the Y arm 76 consists of a U shaped track 83 having V shaped grooves 142 and 143 formed in the outer surfaces of the opposite legs thereof for engagement by the guide wheels 82 on the pen carriage assembly 81. Track 83 receives an etched circuit card 144 having a plurality of conductive strips formed therein and engaged by the brushes in a brush block 145. A channel 146 is formed in the etched circuit board 144 to receive the wound Y potentiometer 147 which is engaged by a brush or wiper 148. It should be noted that the wound potentiometer 147 is slightly inclined with respect to the conductive strips on the etched circuit board 144 so that the brush or wiper 148 contacts the potentiometer at different points across its width to distribute the wear thereon. It is also preferable to provide an absorbent pad adjacent the contact on the spring brush arm 148 which can be impregnated with a suitable cleaning and lubricating compound to minimize wear and noise in the potentiometer contact.

Figure 7:
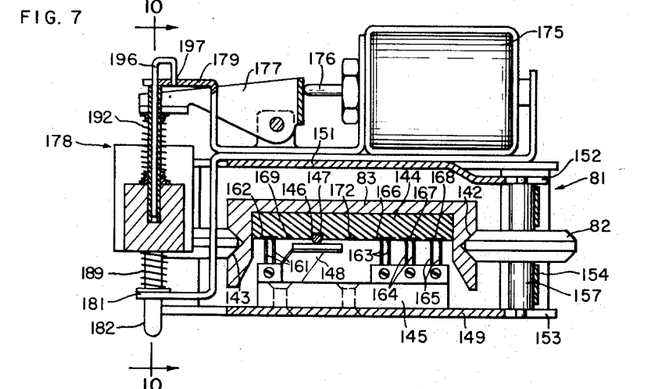
FIGURE 7 is a transverse sectional view through the pen carriage and Y arm along the line 7—7 of FIGURE 1.
Figure 8:
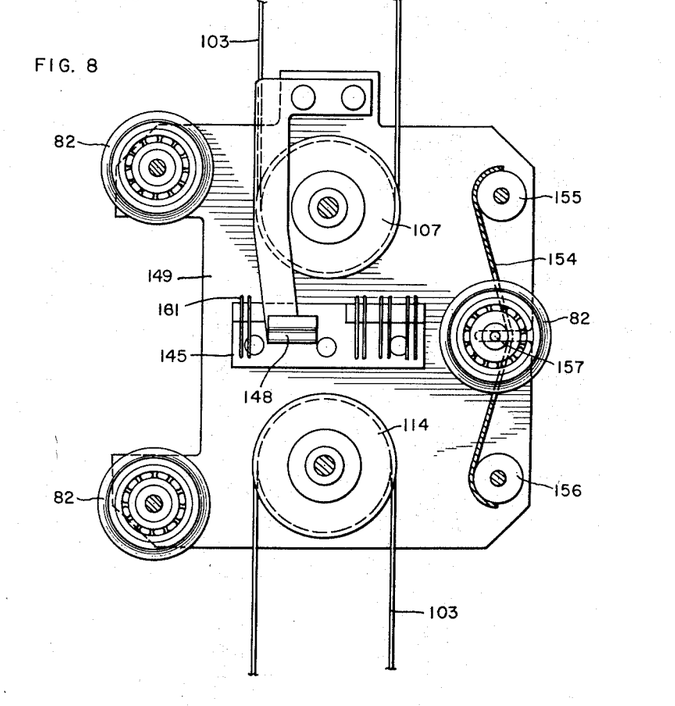
FIGURE 8 is a plan view of the lower mounting plate of the pen carriage assembly with the upper mounting plate and Y arm removed to illustrate the brush block mounting as well as the pulley and guide wheel arrangement.

The brush block 145 is mounted on a bottom mounting plate 149 which together with the top mounting plate 151 supports therebetween the guide wheels 82 and the pulleys 107 and 114 on their respective shafts. The single guide wheel 82 on one side of the pen carriage has the opposite ends of its shaft slideably mounted for rotation in the slots 152 and 153 in the top and bottom mounting plates respectively, and this wheel is resiliently maintained in contact with the groove 142 in the track 83 by means of the resilient clip or spring 154 engaging posts 155 and 156 at its outer ends and pressing inwardly against the shaft 157.

One set of brushes 161 on the brush block 145 contacts the conductive strip 162 and three sets of brushes 163, 164 and 165 contact the conductive strips 166, 167 and 168 respectively for purposes to be described hereinafter in connection with the circuit diagram of FIGURE 11.

Figure 9:
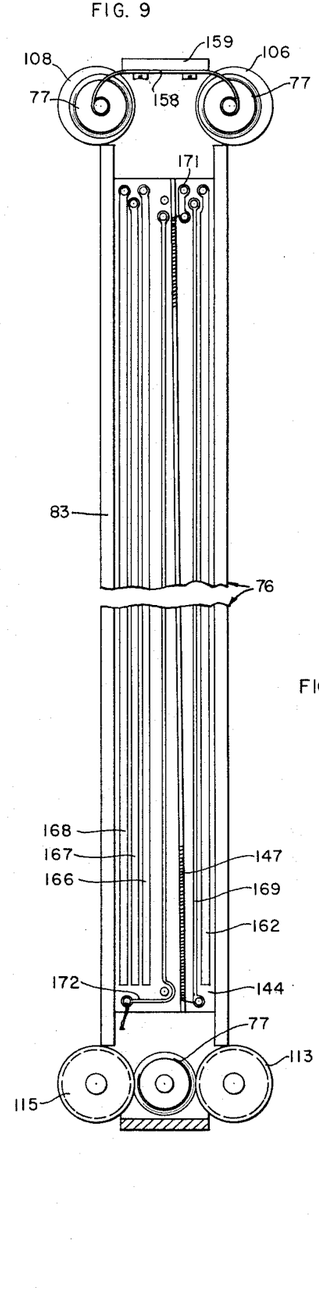
FIGURE 9 is a bottom view of the Y arm illustrating the etched circuit and potentiometer mounting therein.

The conductive strip 169 is connected to one end of the Y potentiometer 147 and a short conductive strip 171 is connected to the opposite end of the Y potentiometer 147 to make suitable electrical connections thereto.

The other conductive strip 172 is connected at one end to a second brush or wiper 173 which contacts the X potentiometer 174 as shown in FIGURE 4.

Wiper 173 is also preferably provided with an absorbent pad adjacent to the metal contact area which can be impregnated with a suitable cleaning and lubricating compound.

A solenoid 175 is mounted on top of the upper mounting plate 151 and is provided with a core or pin 176 which engages an actuating lever 177 for the pen assembly 178.

The pen assembly 178, as shown in FIGURE 7, is mounted between an upper bracket 179 and a lower bracket 181 which are both secured to the upper mounting plate 151 on the pen carriage assembly 81.

Figure 10:
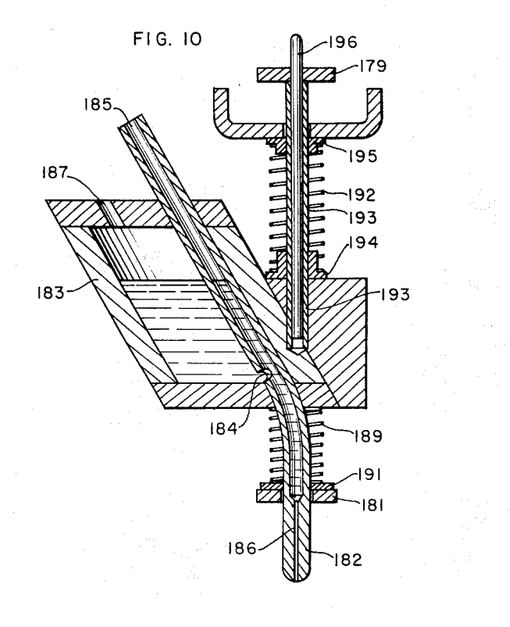
FIGURE 10 is a detailed sectional view along the line 10—10 of FIGURE 7 showing the pen assembly and its actuating mechanism.

The pen assembly is shown in more detail in the sectional view of FIGURE 10 wherein the capillary tube 182 is bent to extend through an inclined ink reservoir 183 and is provided with a feed opening or orfice 184. The upper end of tube 182 has a relatively large internal cross section or passage 185 whereas the lower portion has a restricted passage 186 to provide a capillary action which limits the flow of ink and prevents dripping. A feed and vent opening 187 is provided in the top wall of the reservoir 183, and the reservoir itself is preferably formed of transparent material such as clear Plexiglas so that the ink level in the reservoir may be readily ascertained. It will be apparent that the inclined position of the ink reservoir 183 and the upper end of the tubing 182 will permit the recorder to be used in either a horizontal or upright position.

A coil spring 189 resiliently engages a washer 191 and urges the washer 191 against the bracket 181. Another coil spring 192 surrounds the tubing or guide 193 and engages a collar or spring retainer at one end and another collar 195 at the opposite end which bears against the outer end of the pen actuating lever 177. A retaining wire 196 is slideably mounted in the tubing 193 and is provided with a hooked upper end which engages an opening 197 in the upper bracket 179 to retain the pen assembly in its proper position.

It will be apparent that the pen assembly 178 is resiliently mounted between the upper and lower brackets 179 and 181 in a position where the pen assembly 178 may be moved downwards by the actuating lever 177 to resiliently contact the end of the capillary tube 182 with the graph paper on the plot table 71. By disengaging the hooked upper end of the retaining wire 196 the pen assembly may be readily removed from the pen carriage assembly and quickly replaced.

If desired, the pen assembly 178 and the solenoid 175 together with the pen actuating lever 177 on the bracket 81 may be replaced by a multiple symbol character printing wheel 197 formed of a material such as "Porelon," manufactured by S. C. Johnson and Co., which may be impregnated with ink and manually or automatically indexed for printing a series of points on different graphs for point plot operation or printing without typewriter ribbon or carbon paper thus providing clean operation requiring no messy inking problems.

Figure 11:
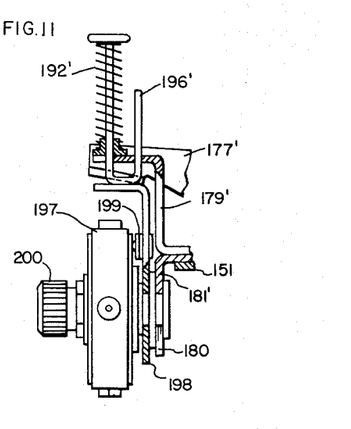
FIGURE 11 is an end view of a printing wheel assembly with portions broken away.
Figure 12:
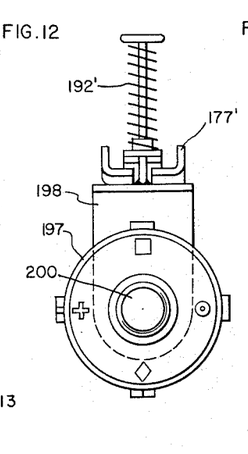
FIGURE 12 is a front view of the printing wheel assembly of FIGURE 11.

As illustrated in FIGURES 11 and 12, the multiple symbol character printing wheel 197 is rotatably mounted on an arm 198 which is resiliently mounted between upper and lower brackets 179' and 181', which are similar to the brackets 179 and 181 for supporting the pen assembly 178, but the lower bracket 181' is provided with a guide slot 180 which receives the wheel 197.

A detent 199 engages a plurality of indexing recesses (not shown) in the wheel 197 to properly position the characters, when the wheel 197 is manually indexed by the knurled knob 200 rotating wheel 197 in the arm 198.

A coil spring 192' is mounted on the retaining wire 196' which is secured to the top of arm 198 and holds the wheel 197 in its upper position until it is depressed by the actuating lever 177'.

The multiple symbol printing wheel 197 as illustrated in FIGURES 11 and 12 of the present application, may be readily substituted for the pen assembly 178 and would be actuated by means of the solenoid 175 and pin 176 when actuated through brushes 163 and 164 on the etched circuit board 144 mounted under the Y arm 76.

Figure 13:
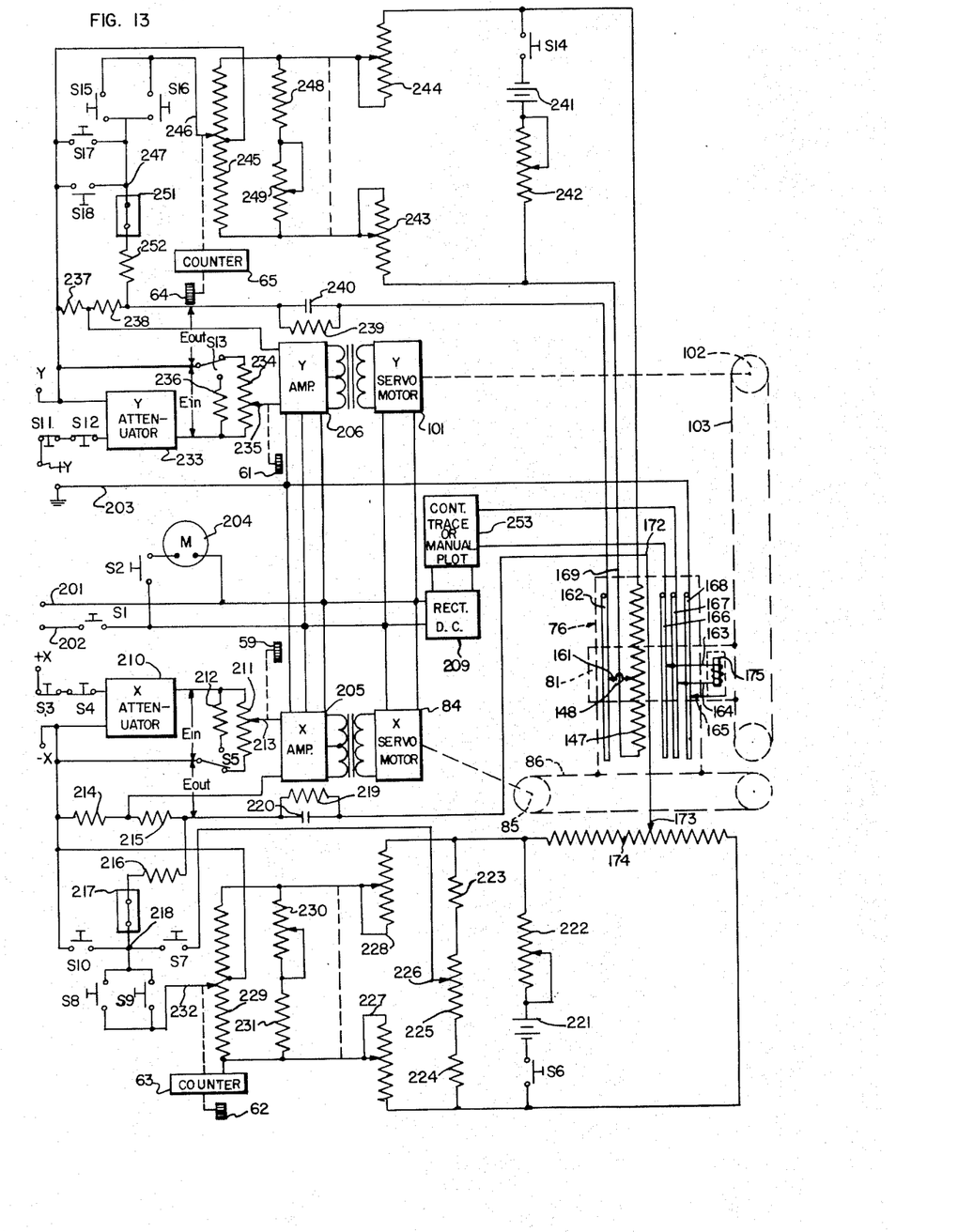
FIGURE 13 is a schematic block diagram illustrating one preferred embodiment of electrical circuitry utilized with the X-Y plotter of the present invention.

In the circuit diagram of FIGURE 13, wherein certain portions are shown in block diagram form and other portions are shown as a schematic circuit diagram, one preferred embodiment of electrical circuitry for operating the X-Y plotter of the present invention is illustrated with individual switches shown in their proximate position in the circuitry. These switches, as well as details of the attenuators and the continuous trace or manual plot, are illustrated in detail in FIGURES 14, 15 and 16 to show the manner in which they are ganged or otherwise positioned in the push button array, as illustrated on the control panel 23 in FIGURE 1.

Referring now to the circuit diagram of FIGURE 13 in detail, A.C. power is supplied to the terminals 201 and 202 and a ground connection to the terminal 203. Power is applied directly from the terminal 201 to the vacuum motor 204 and to the X and Y amplifiers 205 and 206 and to the X and Y servo motors 84 and 101 respectively. Power is also supplied directly to the D.C. rectifier 209.

Power from the other terminal 202 is applied through a switch S1 directly to the X and Y amplifiers 205 and 206, to the X and Y servo motors 84 and 101, and to D.C. rectifier 209. It is also applied through another switch S2 to the vacuum motor 204.

The +X and −X as well as the +Y and −Y inputs are merely nominal designations of the polarity of the input signals which indicate the direction of motion of the plotter Y arm 76 and pen carriage assembly 81, i.e., up and right for positive inputs and down and left for negative inputs. Actually, these inputs can be either + or − voltages, since the input is floating and isolated from ground and from each other.

The +X input signals are applied through normally closed switches S3 and S4 to one side of the X attenuator 210. The −X signals are also applied to the X attenuator 210, as well as a voltage divider network including the X axis potentiometer 174, as illustrated structurally in FIGURE 4.

The output signal from the attenuator 210 is selectively connected by a switch S5 through the X axis vernier or potentiometer 211 or through a fixed resistance 212 directly to the −X terminal. The brush or wiper 213 of the potentiometer 211 is connected to one input of the X amplifier 205 and is actuated by the thumb wheel 59, as illustrated in FIGURE 1. The thumb wheel 59 may conveniently be coupled to the switch S5 and move it to its alternate position in one extreme position of the potentiometer 212.

The −X input is also coupled through a resistance 214 to the other input of the X amplifier 205 and through another resistance 215 to a resistance 216 and the shorted terminal board 217 to a reference point 218. The other input to the X amplifier is also coupled through resistance 215 and parallel resistance 219 and capacitance 220 to the wiper 173 on the X axis potentiometer 174.

One leg of the voltage divider network for the X axis potentiometer 174 includes a battery 221 in series with a switch S6 and a potentiometer 222 which serves as the X axis calibration control.

Another leg of the divider network for the X axis plot clear function includes resistances 223 and 224 as well as a potentiometer 225 with a wiper 226 which is connected through a switch S7 to the reference point 218.

Another leg of the divider network includes the two coupled potentiometers 227 and 228 which provide the X axis centering control and also the center tapped potentiometer 229 which serves the function of X axis reference. Another potentiometer 230 and a resistance 231 in parallel with the X axis reference potentiometer 229 provide an X axis correspondence control.

The wiper 232 on the X axis reference potentiometer 229 is connected through the parallel switches S8 and S9 to the reference point 218 and is mechanically coupled to counter 63, both of which are actuated by thumb wheel 62 as shown in FIGURE 1.

The center tap of the X axis reference potentiometer 229 is connected to the —X input and is also connected through a switch S10 to the reference point 218.

The Y axis side of the circuit is quite similar to the X axis and includes a +Y input through normally closed switches S11 and S12 to the Y attenuator 233 and a —Y input which also goes to the Y attenuator 233 and to the switch S13 connected to the Y scale vernier or potentiometer 234, the wiper 235 being connected to one input of the Y amplifier 206. Switch S13 in its alternate position is also connected to the output of the Y attenuator through resistance 236. The wiper 235 of potentiometer 234 is actuated by the thumb wheel 61 shown in FIGURE 1, and it may also be coupled to the switch S13 for selective actuation thereof.

The —Y input is also coupled through resistance 237 to the Y amplifier 206 and through resistance 238 and the parallel resistance 239 and capacitance 240 to the conductive strip 162 on the etched circuit board 144 (shown in FIGURE 9) which is coupled by interconnected brushes 161 and 148 to the Y axis potentiometer 147 which forms one leg of the Y divider network.

Another leg of the Y divider network includes a battery 241 in series with a switch S14 and the Y axis calibration control potentiometer 242.

Another leg of the voltage divider network includes the coupled potentiometers 243 and 244 for Y axis centering control in series with the Y axis reference potentiometer 245, the wiper 246 being actuated by the thumb wheel 64 which is mechanically coupled to the counter 65. The center tap of potentiometer 245 is connected directly to the —Y input and the wiper 246 is connected through parallel switches S15 and S16 to the reference point 247. A resistance 248 and a potentiometer 249 are paralleled across the Y axis reference potentiometer 245 to provide the Y axis correspondence control.

The reference point 247 is also connected through parallel switches S17 and S18 and to the center tap on potentiometer 245, to the —Y input and also through the shorted terminal board 251 and resistances 252 and 238 to the input of the Y amplifier 206.

The Y arm 76 and the pen carriage assembly 81 are shown schematically in FIGURE 13 with the Y arm 76 being driven along the X axis by the X servo motor 84, drum 85 and cable 86, and the pen carriage 81 being driven along the Y axis by the Y servo motor 101, drum 102 and cable 103. The pen solenoid 175 is connected by brushes 163 and 164 to the conductive strips 166 and 167 for actuation of the solenoid and pen assembly by the continuous trace or manual plot button indicated by the block 253 and shown in detail in FIGURE 15. The pen carriage is connected to ground through brush 165 contacting conductive strip 168 which is connected to the ground terminal 203.

Figure 15:
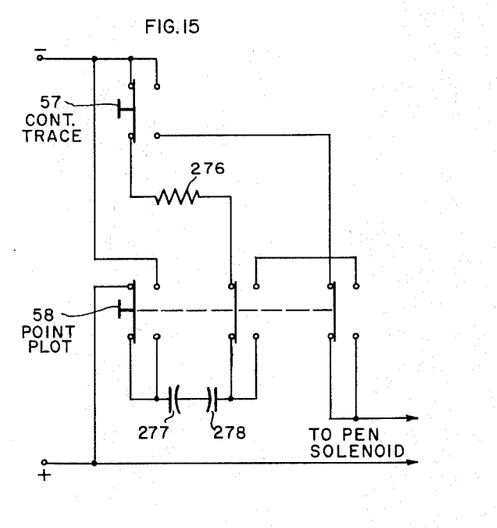
FIGURE 15 is a detailed schematic illustrating the push button switch arrangement for selecting a continuous trace or manual plot with the circuit illustrated in block diagram form in FIGURE 13.

Referring now to FIGURE 15, two push button switches 57 and 58, also shown in FIGURE 1, may be selectively operated to provide a continuous trace or point plot by actuating the solenoid 175 and the pen assembly 178. Push button switch 57, for continuous trace operation may be pressed manually to connect the D.C. current from the D.C. rectifier 209 directly to the pen solenoid 175 and is locked in position until it is pressed a second time at which time it will be released to its normal position as shown in FIGURE 15.

In the schematic diagram of FIGURE 15 with the push button switches 57 and 58 in the position as shown, it will be apparent that a circuit is completed through a resistance 276 between the positive and negative input terminals to charge the condensers 277 and 278. When the point plot switch 58 is depressed to its alternate position, it will be apparent that the charging circuit will be open and another circuit will be closed with a reverse polarity applied to the condensers 277 and 278 and through the pen solenoid 175 to provide a voltage doubling effect and rapid operation of the solenoid 175 and pen assembly 178.

Figure 14:
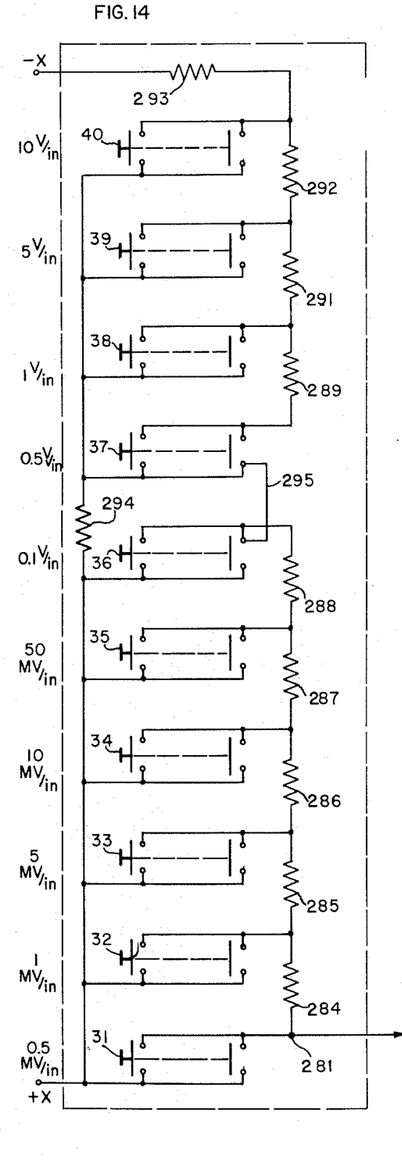
FIGURE 14 is a detailed schematic showing one preferred push button type of range scale attenuator for use in the block diagram of FIGURE 13.

The X attenuator which is shown in block diagram form in FIGURE 13 is shown in a detailed schematic diagram in FIGURE 14, and the Y attenuator of FIGURE 13 will be identical.

The push button switches 31 through 40 on the control panel 23 of FIGURE 1 actuate a plurality of pairs of switch contacts, as illustrated in FIGURE 14, to control the flow of current through the attenuator to a reference point 281 in such a manner that the voltage at the reference point 281 is always less than a pre-determined optimum value for full scale operation of the X-Y plotter.

The reference point 281 is connected directly to the X scale vernier of potentiometer 211, and is also connected through the resistance 212 to the switch S5, as illustrated in FIGURE 13.

Each push button switch is for use with voltages of a pre-determined magnitude, such as those indicated, and the signal is attenuated for all push button positions, except when push button 31 is depressed. For example, when the push button 32 is depressed, the output signal is attenuated by the resistor 284 and when the push button 33 is depressed, the signal is attenuated by both resistors 285 and 284 and so on through push button 36. However, it should be noted that a relatively large resistance 294 is provided between the switches 36 and 37 and only a portion of the current going through this resistor will go through a jumper 295 and the resistances 288 through 284 to the reference point 281 which provides the output signal, since a portion of the current will be bypassed through a resistance 289, 291, 292 and a resistance 293 directly to the —X input.

Typical examples of suitable resistance and condenser values for the circuits shown in FIGURES 13, 14 and 15 are set forth in the following table:

| Potentiometer: | Ohms |
|---|---|
| 147 | 2565.2 |
| 174 | 3835.7 |
| 211 | 6K |
| 222 | 750 |
| 225 | 50 |
| 227 | 100 |
| 228 | 100 |
| 229 | 25K |
| 230 | 25K |
| 234 | 6K |
| 242 | 750K |
| 243 | 100 |
| 244 | 100 |
| 245 | 2.5K |
| 249 | 25K |

| Capacitor: | Microfarads |
|---|---|
| 220 | .033 |
| 240 | .022 |
| 277 | 50 |
| 278 | 50 |

| Resistance: | | |
|---|---|---|
| 212 | ohms | 5K |
| 214 | do | 7.5K |
| 215 | do | 2.5K |
| 216 | do | 980K |
| 219 | do | 980K |
| 223 | do | 7.5K |
| 224 | do | 100 |
| 231 | do | 1.8K |
| 236 | do | 5K |
| 237 | do | 5K |
| 238 | do | 5K |
| 239 | do | 980K |
| 248 | do | 1.8K |
| 252 | do | 980K |
| 276 | do | 1K |
| 284 | do | 5K |
| 285 | do | 40K |
| 286 | do | 50K |
| 287 | do | 400K |
| 288 | do | 500K |
| 289 | do | 714,286 |
| 291 | do | 243,161 |
| 292 | do | 21,934 |
| 293 | do | 20,619 |
| 294 | megohms | 2 |

Figure 16:
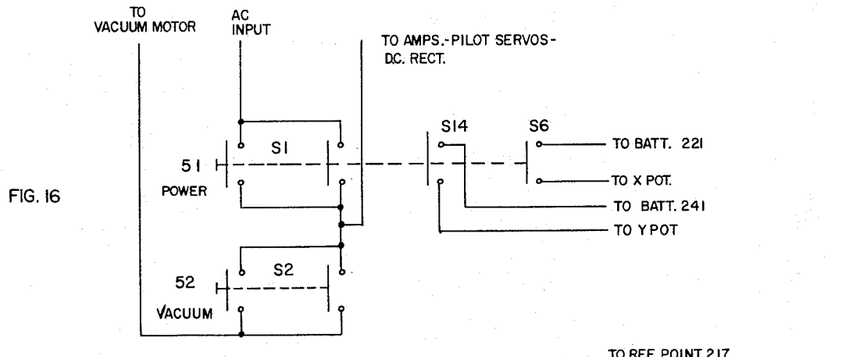
FIGURE 16 is a detailed schematic showing one particular power and vacuum push button switch arrangement for controlling certain of the switches illustrated in FIGURE 13.
Figure 17:
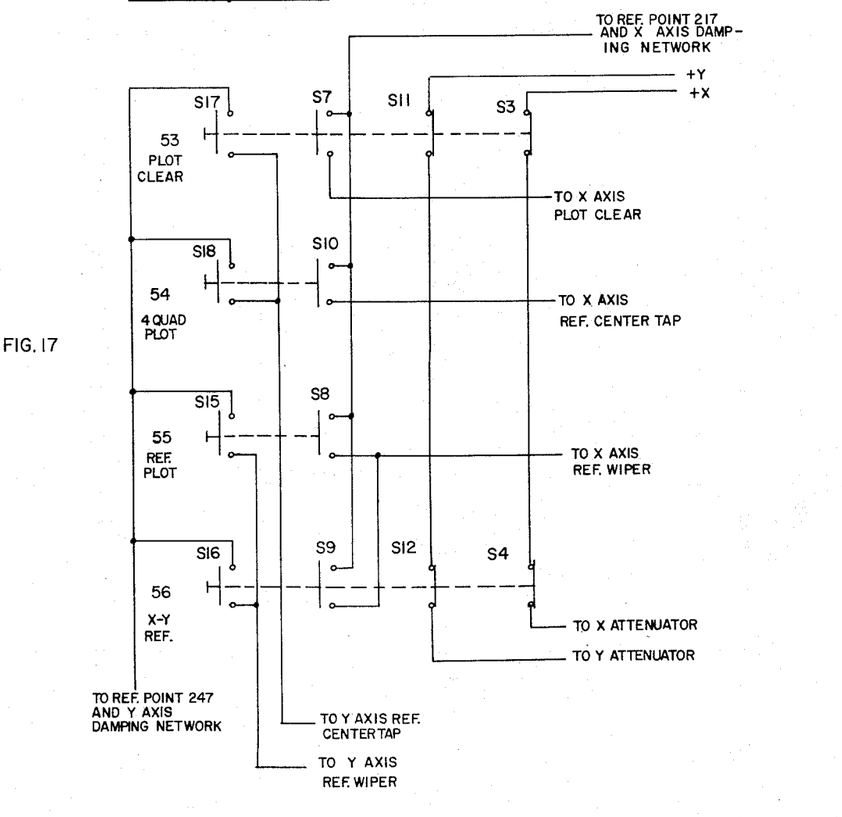
FIGURE 17 is a detailed schematic showing the push button combination of certain switches in FIGURE 13 for the plot clear, four quadrant plot, reference plot and X-Y reference function.

While the individual switches have been illustrated in FIGURE 13 in their proximate positions in the circuit, the actual ganging or coupling of these switches on the push button contacts have been illustrated in FIGURES 16 and 17 as well as FIGURE 15 which has been previously described.

FIGURE 16 illustrates the actual combination of switches operated by the power push button 51 and the vacuum push button 52.

The push button 51 operates switch S1 which provides power to the amplifiers, servos and the D.C. rectifier, and also through switch S2 to the vacuum motor when push button 52 is also depressed.

Push button 51 also actuates switches S6 and S14 to connect the batteries 221 and 241 across the X and Y axis potentiometers, as illustrated in FIGURE 13.

The push button switches 53, 54, 55 and 56 in FIGURE 17 provide the functional control for the X-Y plotter of the present invention.

When the plot clear button 53 is depressed, normally open switches S17 and S7 are closed and normally closed switches S11 and S3 are opened. This, in effect, removes the X and Y signals, while connecting the reference points 218 and 247 to the wiper 226 on the X axis plot clear potentiometer 225 and to the center tap of the Y axis reference respectively, to remove the Y arm 76 off the plotting area with the pen carriage 81 in a central position.

Depressing push button 54 for the four quadrant plot closes switches S18 and S10 which connects the reference points 218 and 247 to the center taps of the X and Y axis reference potentiometers 229 and 245 respectively. In this position with no input signal the Y arm 76 and the pen carriage 81 are both centered with the pen over the + mark 72 and all input signals are plotted from this reference position.

When the push button 55 is depressed for the reference plot function, the switches S8 and S15 are closed which effectively connects the reference points 218 and 247 to the wipers 232 and 246 on thte X and Y axis reference potentiometers 229 and 245 respectively. In this position input signals are plotted from any desired reference position on the plot area as determined by adjustment of the X and Y axis reference potentiometers 229 and 245 by the operation of the thumb wheels 62 and 64, the distance of each axis from the lower left hand fiduciary mark being indicated by the counters 63 and 65 on the control panel 23.

The push button 56 is depressed to position the pen at the origin for the reference plot by closing switches S9 and S16 which connect the reference points 218 and 247 to the X and Y reference potentiometer wipers 232 and 246 and also opens the switches S4 and S12, so that the X and Y input signals are removed to thus position the pen at the origin for the X-Y reference, or reference plot.

*Operation*

In the operation of the X-Y plotter of the present invention the scale selector switch is set to 10 volts per inch by depressing the push button 40 and the push button 53 is depressed to place the plotter in a plot clear position before energizing the plotter by depressing the power push button 51. The graph paper is aligned on the plotter by using the back lighted grid marks or fiduciary marks such as 73 and 74 to position the paper. Next, the vacuum push button 52 is depressed to energize the vacuum motor and hold the graph paper securely in place on the plot area.

For a four quadrant plot with the origin in the center of the plot area, energize the four quadrant plot push button 54. If the origin is desired at any other point, push the X-Y reference push button 56 and use the X reference and Y reference controls 62 and 64 to position the origin at the desired location which will be indicated on the counters 63 and 65. Then place the plotter in the reference plot position by depressing the push button 55.

The desired X and Y input leads and a ground connection are plugged into the corresponding input jacks 27, or if desired, a multiple pin plug receptacle (not shown) may be provided on the opposite side of the cabinet for parallel inputs from various accessory equipment.

Next, reduce the scale of the plotter to a convenient range by depressing corresponding range scale buttons in each of the X and Y range scale selectors 31 through 40 and 41 through 50 respectively, so that the input voltages give a clear plot on the plot area. If desired, the scales may be varied between the preset values determined by the push button by utilizing the X and Y vernier scales 59 and 61.

To de-energize the equipment, place the scale selector switch to the 10 volts per inch position by depressing the push buttons 40 and 50, depress the push button 53 to put the plotter in the plot clear position, and then turn off the power switch 51 and vacuum motor switch 52.

*Theory of operation*

The X-Y plotter of the present invention makes use of the Cartesian coordinate system to record points on a rectangular plot.

On the plotter, the position of the Y arm 76 corresponds to an X ordinate, while the position of the pen carriage 81 corresponds to a Y ordinate. These coordinates (X and Y) which define points on the plot are controlled by the D.C. voltages which are applied as inputs to the plotter. The two variables (X and Y) are independent of each other and record points by simultaneously positioning the Y arm 76 (X ordinate) and the pen carriage 81 (Y ordinate) with respect to a reference origin. This origin may be translated to any position on the plot. The positioning of the arm and pen carriage is accomplished by two servo systems which operate independently of each other as illustrated in FIGURE 13.

In each servo mechanism an output quantity proportional to the output is monitored and compared with an input quantity proportional to the input. If any difference exists, the difference is used to actuate the system and cause the output to equal the input value.

The output quantity is a D.C. voltage $E_{out}$ indicated in FIGURE 13 and it is proportional to a displacement X on the plot in accordance with the position of the wiper 173 on the X potentiometer 174, since the voltage from the battery 221 will vary across this potentiometer and is compared with a voltage at a reference point 218 determined by its connection to other points in the voltage divider network. The input quantity is a D.C. voltage $E_{in}$ and is proportional to a D.C. voltage which is applied to the input jacks. The difference between these two voltages ($E_{in}$ and $E_{out}$) is an error voltage which is applied to the amplifier, which in turn actuates the servo motor 84 to act in a direction to decrease the error by moving the Y arm 76 and the X axis wiper 173 on the X axis potentiometer 174, thus causing the output to correspond with the input.

With no input voltage to the plotter, the pen arm positions itself corresponding to the position of the reference potentiometer wipers 232 and 246, set by the reference control for either X or Y or to any other voltage which may appear at the reference point 218 or reference point 247 depending on the position of the push button switches 53, 54, 55 and 56. With the wiper 232 or 246 in the center of their respective potentiometers, at the reference ground, the origin of the plot is in the center. This is also true of the four quadrant plot position. Shifting this wiper away from the center position shifts the origin correspondingly away from center of the plot. Thus the origin may be shifted to any point by this means.

The maximum value that the error voltage can take on is 7.5 millivolts for the X axis or 5.0 millivolts for the Y axis. The input attenuators 210 and 233 scale down voltage inputs to the levels indicated above. This method insures that all scales will have exactly the same reference, no matter what scale the plotter is set on.

The potentiometers utilized for adjusting and calibrating the X-Y plotter are preferably mounted on the bottom of the control panel and chassis assembly 23 and the adjustments are preferably made by screw driver adjustments extending through the bottom of the chassis and not shown in FIGURE 1.

To calibrate the plotter completely all that is required is a standard cell with an E.M.F. of 1.019 volts.

The plotter is first placed in a vertical position and a cover (not shown) is removed from the back of the chassis to allow access to the adjustment controls. After the plotter is energized, it is placed in the four quadrant plot position without any input voltages to the plotter, and the X and Y calibration controls 222 and 242 should be approximately in the center of their travel.

If the pen is not positioned in the center of the plot over the plus mark 72, then adjust the X and Y centering controls (227 and 228, 243 and 244) until the pen is exactly in the center of the plot.

The plotter is next placed in the X-Y reference position with the counters reading 0 and 0, and if the pen does not coincide with the grid mark at the lower left hand corner of the platen, the respective correspondence controls 230 and 249 are adjusted until the pen coincides with the grid mark.

If the X and Y reference verniers are now adjusted until the counters read 15.0 and 10, the pen should line up exactly over the platen mark at the upper right hand corner at 74. If a small error does occur, this is due to a non-linearity in the card potentiometers. Adjust the correspondence controls 230 and 249 until the error for each axis is half of the error noted by checking the left lower corner with the reference controls at 0 and 0.

The plotter is next placed in the reference plot position with the origin at 0 and 0. The shorting bars are removed from the X and Y terminal boards 217 and 251 and a standard cell is connected between these terminals in sequence. The X axis calibration control 222 is adjusted until the pen is positioned directly over the calibration mark (not shown) at the lower right hand of the platen slightly to the right of the paper alignment marks. Then the Y axis calibration control is adjusted with the standard cell connected across the terminal board 251 until the pen is positioned directly over the calibration mark at the upper left hand corner of the platen, slightly above the paper alignment mark 73.

Obviously, many other modifications and variations of the present invention may be made within the scope of the following claims.

What is claimed is:

1. An X-Y plotter comprising a cabinet supporting a plot table, a pair of spaced parallel tracks extending across said plot table and a pair of spaced parallel end walls extending between said tracks and forming therewith a vacuum chamber, a removable platen supported on said tracks and end walls and provided with a plurality of peripheral openings adapted to hold graph paper in position on the plot area of said platen, an opening extending through said supporting structure below said vacuum chamber and a vacuum impeller mounted below said opening and adapted to evacuate said vacuum chamber, a Y arm having a plurality of guide wheels engaging said tracks and mounted for movement across the plot table in the direction of the X ordinate, said Y arm having an inverted U-shaped track with grooves formed in the opposite sides thereof, a carriage assembly having a plurality of guide wheels engaging the grooves in said U-shaped track and adapted to move along said Y arm in the direction of the Y ordinate, a recording device mounted on said carriage assembly, and means including a solenoid adapted to actuate said recording device into contact with graph paper on said platen, an X axis servo and drum and a Y axis servo and drum mounted on said supporting structure below one end of the plot table, at least one pair of pulleys mounted adjacent each corner of said plot table and at least two auxiliary pulleys mounted outboard of the two corners of the plot table adjacent said X axis drum, an X axis cable system having a portion connected to each of the opposite ends of said Y arm, said cable system having portions extending from each end of the Y arm around a pulley removed from the drum back around another corner pulley adjacent the drum and a portion having several turns around the Y axis drum and then around one of said auxiliary outboard pulleys back to the opposite end of the Y arm and another portion extending directly across to the other auxiliary outboard pulleys and back to the opposite end of the Y arm to provide a true parallel motion of the Y arm along the X ordinate, a pair of pulleys provided at each end of the Y arm and a pulley provided at each end of the carriage assembly, a Y axis cable system having several turns around the Y axis drum and extending in opposite directions around the adjacent corner pulleys and around one of the pulleys at each end of the Y arm and around the pulleys on the carriage assembly back around the other pulleys on the ends of the Y arm and around the two remote corner pulleys back to a pair of anchor points outboard of said Y drum, and an electrical system adapted to receive X and Y input signals and drive said servo motors to position said Y arm and said carriage assembly to positions along the X and Y coordinates corresponding to said X and Y inputs.

2. An X-Y plotter as set forth in claim 1 wherein said electrical system includes an X axis voltage divider network with an X axis potentiometer in one leg thereof mounted along one of said first tracks and a Y axis voltage divider network with a Y axis potentiometer in one leg thereof, a circuit card mounted in the channel of said U-shaped track and including a plurality of conductive strips and a groove formed therein, said Y axis potentiometer being mounted in said groove, a wiper on said Y arm connected to one of said conductive strips and engaging said X axis potentiometer, a wiper mounted on said carriage assembly and engaging said X axis potentiometer, and a plurality of brushes mounted on said carriage assembly and contacting certain of said conductive strips, one of said brushes being connected to said Y axis wiper and others of said brushes being connected to said solenoid.

3. An X-Y plotter as set forth in claim 1 wherein said cables comprise a stranded cable formed of fine Elgiloy wire and extruded with a nylon jacket.

4. An X-Y plotter comprising a plot table, a Y arm mounted for parallel movement across said plot table in the direction of the X ordinate, a carriage assembly mounted on said Y arm for movement in the direction of the Y ordinate, said carriage assembly including a recording device and an actuating solenoid therefor, an X servo motor and drum with a cable and pulley system connected to said Y arm for movement thereof in the direction of the X ordinate, a Y servo motor and drum with a cable an pulley system connected to said carriage for movement thereof in the direction of the Y ordinate, an electrical circuit and control panel including push button switches and thumb wheel potentiometer controls for selectively activating said circuit and operating said X-Y plotter, said electrical circuit including an X and Y attenuator for receiving X and Y input signals, an X and Y amplifier associated with said respective attenuators and servo motors, X and Y divider networks connected to said respective input signals and amplifiers and potentiometers for generating control signals to said amplifiers for driving said servo motors and positioning said Y arm and carriage in accordance with the X and Y input signals respectively, said divider networks including X and Y axis reference potentiometers in one leg thereof and an X axis plot clear potentiometer in another leg of the X axis divider network, each of said reference potentiometers having a center tap, a reference point in each of the X and Y axis divider networks connected to their respective amplifiers, a plurality of switches between the X axis reference point and various points in the X axis divider network, one of said switches being connected to the X axis plot clear potentiometer wiper, another switch being connected to the X axis reference potentiometer center tap, another switch being connected to the X axis reference potentiometer wiper, the reference point in the Y axis divider network being connected to various points in the Y axis divider network through a plurality of switches, one of said switches being connected to the center tap of the Y axis reference potentiometer, another switch being connected to the Y axis reference potentiometer wiper, one of said push buttons being connected to operate certain of said switches for a plot clear function, another of said push buttons being connected to operate certain of said switches for a four quadrant plot, another push button being connected to operate certain of said switches for a reference plot function, a fourth push button being connected to operate certain of said switches for an X-Y reference function, a pair of said push button switches being connected to a source of D.C. voltage and to the actuating solenoid on the carriage, one of said push buttons operating a switch to provide a continuous source of D.C. current to the solenoid and the other push button being connected through an RC network for charging in one position and instantaneous discharge to the solenoid for a point plot function, a series of X range scale attenuator push buttons and a set of Y range scale attenuator push buttons, said push buttons being connected to selectively operate switches for introducing certain ones of a series of fixed resistances in said attenuator circuits for selective attenuation of the input signals, and X and Y scale verniers selectively positioned between the respective attenuators and amplifiers for gradually varying the attenuation between the fixed limits of the push button attenuator.

References Cited in the file of this patent

UNITED STATES PATENTS

| | | |
|---|---|---|
| 2,322,653 | Mitchell | June 22, 1943 |
| 2,651,400 | Young et al. | Sept. 8, 1953 |
| 2,936,207 | Beaumont et al. | May 10, 1960 |
| 2,937,913 | Boyle | May 24, 1960 |